United States Patent
Kawatani et al.

(10) Patent No.: US 9,092,869 B2
(45) Date of Patent: Jul. 28, 2015

(54) IMAGE PROCESSING APPARATUS, REGION DETERMINING METHOD, AND COMPUTER-READABLE, NON-TRANSITORY MEDIUM

(71) Applicant: PFU LIMITED, Kahoku-shi, Ishikawa (JP)

(72) Inventors: Hirokazu Kawatani, Kahoku (JP); Kiyoto Kosaka, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 14/173,633

(22) Filed: Feb. 5, 2014

(65) Prior Publication Data

US 2014/0294303 A1    Oct. 2, 2014

(30) Foreign Application Priority Data

Mar. 28, 2013 (JP) ................................. 2013-070364

(51) Int. Cl.
*G06K 9/34* (2006.01)
*G06T 7/00* (2006.01)

(52) U.S. Cl.
CPC ..... *G06T 7/0083* (2013.01); *G06T 2207/10008* (2013.01); *G06T 2207/20061* (2013.01); *G06T 2207/30176* (2013.01)

(58) Field of Classification Search
CPC ............. G06T 7/0083; H04N 1/00095; G06K 9/00248; G06K 9/00315; G06K 9/00449; G06K 9/32; G06K 9/6206
USPC .................. 382/173, 175, 176, 178, 179, 180
See application file for complete search history.

(56) References Cited

U.S. PATENT DOCUMENTS

| | | | |
|---|---|---|---|
| 2005/0169531 A1* | 8/2005 | Fan | 382/199 |
| 2008/0170784 A1* | 7/2008 | Guerzhoy et al. | 382/173 |
| 2009/0273818 A1 | 11/2009 | Matsui | |
| 2012/0300267 A1 | 11/2012 | Matsui | |

FOREIGN PATENT DOCUMENTS

JP    2009-272676    11/2009

* cited by examiner

*Primary Examiner* — Ali Bayat
(74) *Attorney, Agent, or Firm* — Christie, Parker & Hale, LLP

(57) ABSTRACT

Provided are an image processing apparatus, a region determining method and a computer-readable, non-transitory medium that can appropriately determine a cutting off region from a read image. The image processing apparatus includes an edge pixel extractor for extracting edge pixels from an input image, a region detector for detecting a subject region surrounded by connected edge pixels among the edge pixels, a straight line detector for detecting a plurality of straight lines within the subject region, a rectangle region detector for detecting a rectangle region formed of four straight lines where two straight lines each are substantially at right angles to each other among the plurality of straight lines, and a region determination module for determining the rectangle region as a cutting off region from the input image when the rectangle region and the subject region are substantially the same.

8 Claims, 14 Drawing Sheets

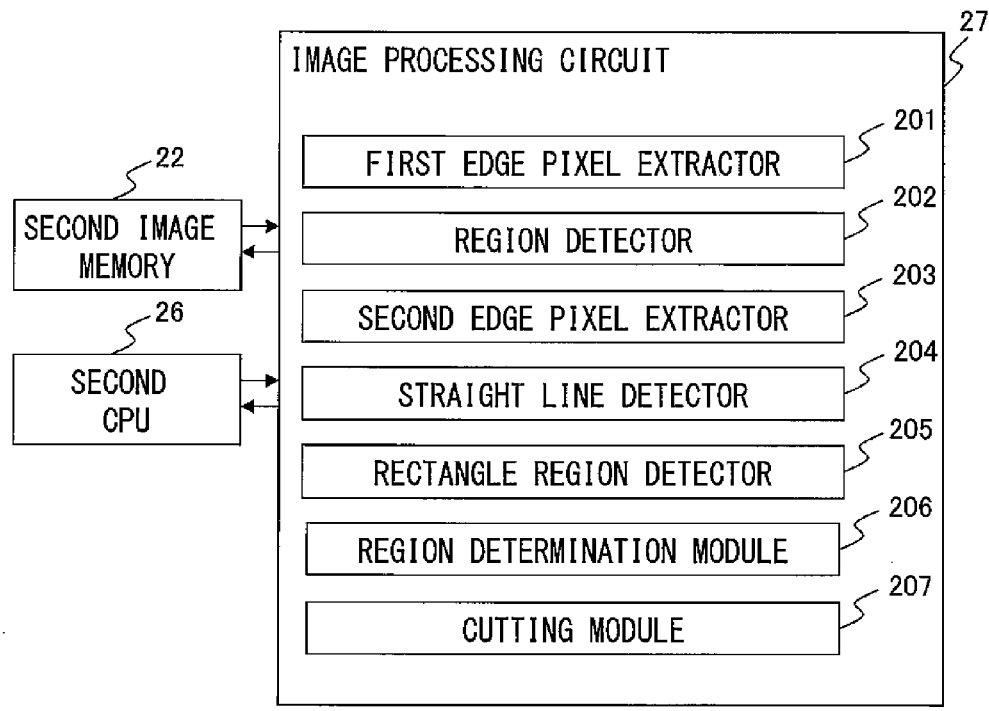
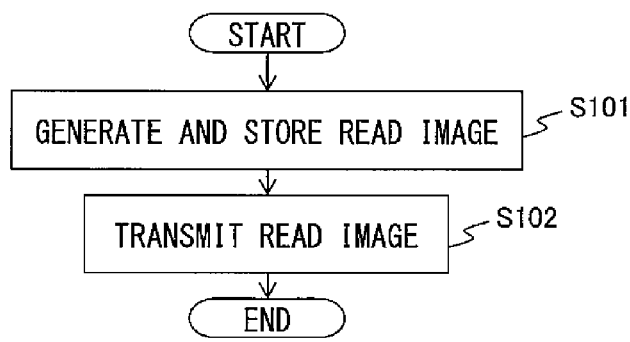

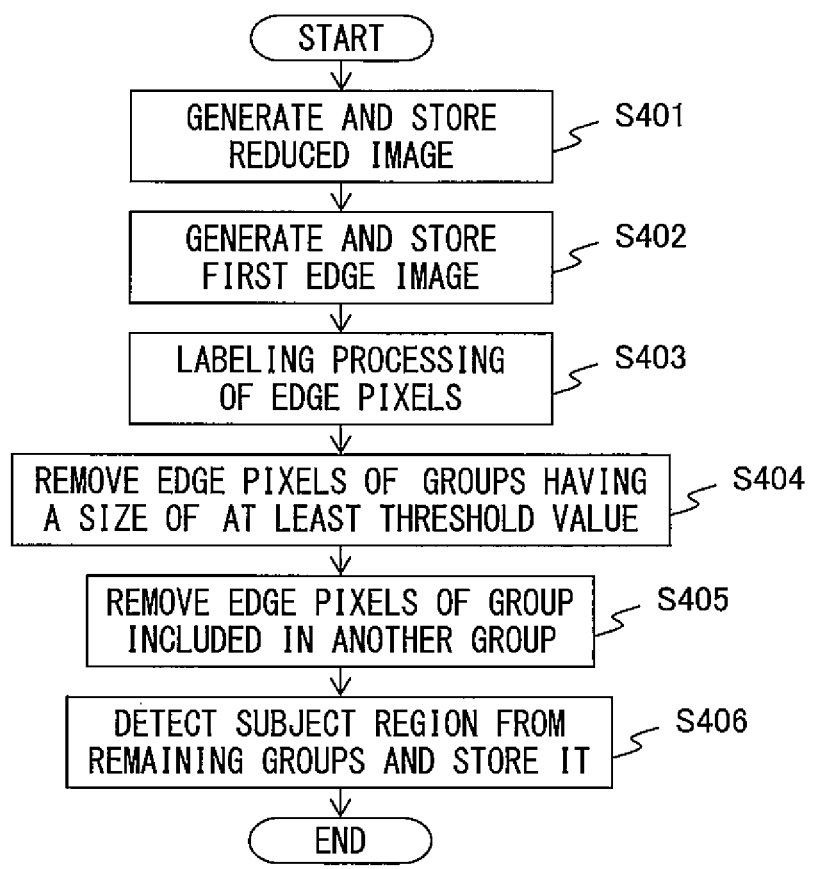

IMAGE PROCESSING APPARATUS, REGION DETERMINING METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2013-070364, filed on Mar. 28, 2013, the entire contents of which are incorporated herein by reference.

TECHNICAL FIELD

Embodiments discussed in the present specification relate to image processing technology.

BACKGROUND

To read a document using a scanner or the like and store it as image data, it is necessary to accurately detect a document region from a read image. In general, in a flatbed-type or automatic document feeding-type scanner, a document region and another region can be easily discriminated using a backing of a monotone color such as white, black, and the like. However, for example, when a document region color and a backing color are the same, there is a possibility that the document region may not be accurately detected.

Japanese Laid-open Patent Publication No. 2009-272676 discloses an image reading apparatus that determines a document region from a read image, by determining the document region based on a degree of coincidence between apex coordinates of a first rectangle region including all subjects extracted from a read image and apex coordinates of a second rectangle region including all subjects determined as a document content among all the subjects and having a smallest area.

When a document is placed, for example, on a woodgrain desk, it is difficult for an image processing apparatus to accurately discriminate an edge of the document from the pattern of the desk and therefore, in some cases, a region including the pattern of the desk is erroneously detected as a document region.

SUMMARY

Accordingly, it is an object of the present invention to provide an image processing apparatus and a region determining method that can appropriately determine a cutting off region from a read image, and a computer-readable, non-transitory medium storing a computer program for causing a computer to implement such a region determining method.

According to an aspect of the apparatus, an image processing apparatus is provided. The image processing apparatus includes an edge pixel extractor for extracting edge pixels from an input image, a region detector for detecting a subject region surrounded by connected edge pixels among the edge pixels, a straight line detector for detecting a plurality of straight lines within the subject region, a rectangle region detector for detecting a rectangle region formed of four straight lines where two straight lines each are substantially at right angles to each other among the plurality of straight lines, and a region determination module for determining the rectangle region as a cutting off region from the input image when the rectangle region and the subject region are substantially the same.

According to an aspect of the method, a region determining method is provided. The region determining method includes extracting edge pixels from an input image, detecting a subject region surrounded by connected edge pixels among the edge pixels, detecting a plurality of straight lines within the subject region, detecting a rectangle region formed of four straight lines where two straight lines each are substantially at right angles to each other among the plurality of straight lines, and determining, using a computer, the rectangle region as a cutting off region from the input image when the rectangle region and the subject region are substantially the same.

According to an aspect of the computer-readable, non-transitory medium storing a computer program, the computer program causes a computer to execute a process, including extracting edge pixels from an input image, detecting a subject region surrounded by connected edge pixels among the edge pixels, detecting a plurality of straight lines within the subject region, detecting a rectangle region formed of four straight lines where two straight lines each are substantially at right angles to each other among the plurality of straight lines, and determining the rectangle region as a cutting off region from the input image when the rectangle region and the subject region are substantially the same.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a schematic configurational diagram of an image processing circuit.

FIG. 3 is a flowchart illustrating an example of an operation of image reading processing.

FIG. 6 is a flowchart illustrating an example of an operation of subject region detection processing.

DESCRIPTION OF EMBODIMENTS

Hereinafter, an image processing apparatus, a region determining method, and computer program according to an embodiment, will be described with reference to the drawings. However, the technical scope of the invention is not limited to these embodiments and extends to the inventions described in the claims and their equivalents.

Figure 1:
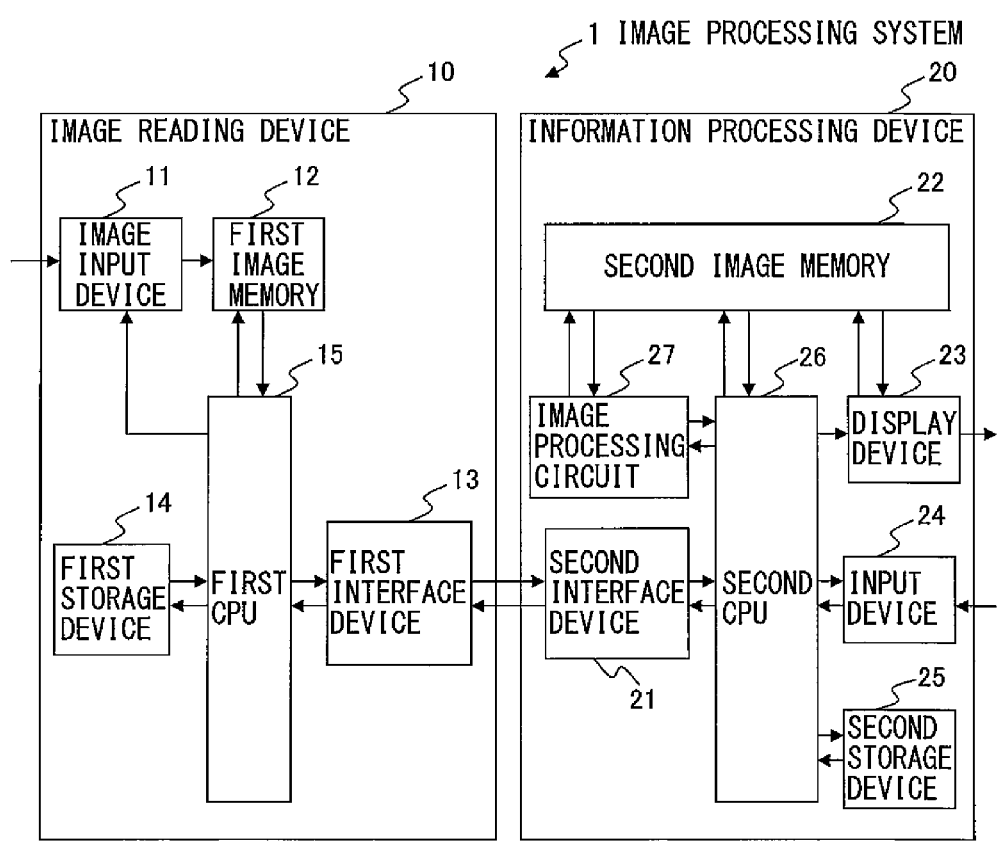
FIG. 1 is a schematic configurational diagram of an image processing system according to an embodiment.

FIG. 1 is a diagram illustrating a schematic configuration of an image processing system according to an embodiment. As illustrated in FIG. 1, an image processing system 1 includes an image reading apparatus 10 and an information processing apparatus 20. The image reading apparatus 10 is, for example, an image scanner or a digital camera, and the information processing apparatus 20 is, for example, a personal computer used by being connected to the image reading apparatus 10.

The image reading apparatus 10 includes an image input device 11, a first image memory 12, a first interface device 13, a first storage device 14, and a first CPU 15. Each unit of the image reading apparatus 10 will be described below in detail.

The image input device 11 includes an image sensor for imaging a document or the like that is an imaging subject. This image sensor includes an imaging element such as a CCD, a CMOS, and the like arrayed one-dimensionally or two-dimensionally and an optical system for focusing an image of an imaging subject onto the imaging element. Each imaging element outputs an analog value corresponding to each color of RGB. The image input device 11 generates pixel data via conversion of each analog value output by the image sensor into a digital value and then generates image data (hereinafter, referred to as an RGB image) including each pixel data generated. This RGB image is color image data including, for example, an RGB value of 24 bits in total where each pixel data is represented with 8 bits with respect to each color of RGB.

The image input device 11 generates an image (hereinafter, referred to as a read image) where an RGB value of each pixel of an RGB image is converted into a brightness value and a color difference value (YUV value) and then stores the thus-generated image on the first image memory 12. The YUV value can be calculated, for example, by the following expressions.

$$Y \text{ value} = 0.30 \times R \text{ value} + 0.59 \times G \text{ value} + 0.11 \times B \text{ value} \quad (1)$$

$$U \text{ value} = -0.17 \times R \text{ value} - 0.33 \times G \text{ value} + 0.50 \times B \text{ value} \quad (2)$$

$$V \text{ value} = 0.50 \times R \text{ value} - 0.42 \times G \text{ value} - 0.08 \times B \text{ value} \quad (3)$$

The first image memory 12 includes a storage device such as a non-volatile semiconductor memory, a volatile semiconductor memory, a magnetic disk, and the like. The first image memory 12 is connected to the image input device 11 to store a read image generated by the image input device 11.

The first interface device 13 includes an interface circuit conforming to a serial bus such as USB and the like, and transmits and receives image data and various kinds of information by being electrically connected to the information processing apparatus 20. Further, the first interface device 13 can be connected to a flash memory or the like to temporarily store image data stored on the first image memory 12 and then the image data is copied for the information processing apparatus 20.

The first storage device 14 includes a memory device such as a RAM (Random Access Memory), a ROM (Read Only Memory), and the like, a fixed disk device such as a hard disk and the like, or a portable storage device such as a flexible disk, an optical disk, and the like. Further, the first storage device 14 stores a computer program, a database, a table, and others used for various types of processing of the image reading apparatus 10. The computer program may be installed on the first storage device 14 from a computer-readable, non-transitory medium such as a compact disk read only memory (CD-ROM), a digital versatile disk read only memory (DVD-ROM), or the like by using a well-known setup program or the like.

The first CPU 15 is connected to the image input device 11, the first image memory 12, the first interface device 13, and the first storage device 14 to control each of these parts. The first CPU 15 controls read image generation of the image input device 11, the first image memory 12, data transmission to/reception from the information processing apparatus 20 via the first interface device 13, the first storage device 14, and others.

The information processing apparatus 20 includes a second interface device 21, a second image memory 22, a display device 23, an input device 24, a second storage device 25, a second CPU 26, and an image processing circuit 27. Each part of the information processing apparatus 20 will be described below in detail.

The second interface device 21 includes an interface circuit similar to the one constituting the first interface device 13 of the image reading apparatus 10 and connects the information processing apparatus 20 and the image reading apparatus 10.

The second image memory 22 includes a storage device similar to the one constituting the first image memory 12 of the image reading apparatus 10. The second image memory 22 stores a read image received from the image reading apparatus 10 via the second interface device 21 and also various types of processed images obtained via image processing of the read image using the image processing circuit 27, by being connected to the image processing circuit 27.

The display device 23 includes a display including a liquid crystal, an organic EL, or the like and an interface circuit for outputting image data to the display and displays image data stored on the second image memory 22 on the display by being connected to the second image memory 22.

The input device 24 includes an input device such as a keyboard, a mouse, and the like and an interface circuit for acquiring signals from the input device and outputs signals in response to an operation of the user to the second CPU 26.

The second storage device 25 includes a memory device, fixed disk device, or portable storage device similar to the one constituting the first storage device 14 of the image reading apparatus 10. The second storage device 25 stores a computer program, a database, a table, and others used for various types of processing of the information processing apparatus 20. The computer program may be installed on the second storage device 25 from a computer-readable, non-transitory medium such as a compact disk read only memory (CD-ROM), a digital versatile disk read only memory (DVD-ROM), or the like by using a well-known setup program or the like.

The second CPU 26 is connected to the second interface device 21, the second image memory 22, the display device 23, the input device 24, the second storage device 25, and the image processing circuit 27 to control each of these parts. The second CPU 26 controls data transmission to/reception from the image reading apparatus 10 via the second interface device 21, the second image memory 22, display by the display device 23, an input of the input device 24, the second storage device 25, image processing by the image processing circuit 27, and others.

The image processing circuit 27 is connected to the second image memory 22 to execute document cutting processing. This image processing circuit 27 operates based on a program previously stored on the second storage device 25 in accordance with a control from the second CPU 26 by being connected to the second CPU 26. Herein, the image processing circuit 27 can be configured using an independent integrated circuit, microprocessor, firmware, or the like.

FIG. 2 is a diagram illustrating a schematic configuration of the image processing circuit 27. As illustrated in FIG. 2, the image processing circuit 27 includes a first edge pixel extractor 201, a region detector 202, a second edge pixel extractor 203, a straight line detector 204, a rectangle region detector 205, a region determination module 206, and a cutting module 207. Each of these units is a functional module mounted by software operating on a processor. Herein, these units can each be configured using an integrated circuit, a microprocessor, a firmware, and the like independent of each other.

FIG. 3 is a flowchart illustrating an operation of image reading processing of the image reading apparatus 10. With reference to the flowchart illustrated in FIG. 3, the operation of image reading processing is described below. The operation flow described below is executed mainly by the first CPU 15 based on a program previously stored on the first storage device 14 in collaboration with each element of the image reading apparatus 10.

Initially, the image input device 11 generates a read image obtained by imaging a document that is an imaging subject and stores the image on the first image memory 12 (step S101).

Subsequently, the first CPU 15 transmits the read image stored on the first image memory 12 to the information processing apparatus 20 via the first interface device 13 (step S102) and then ends a series of steps.

Figure 4:
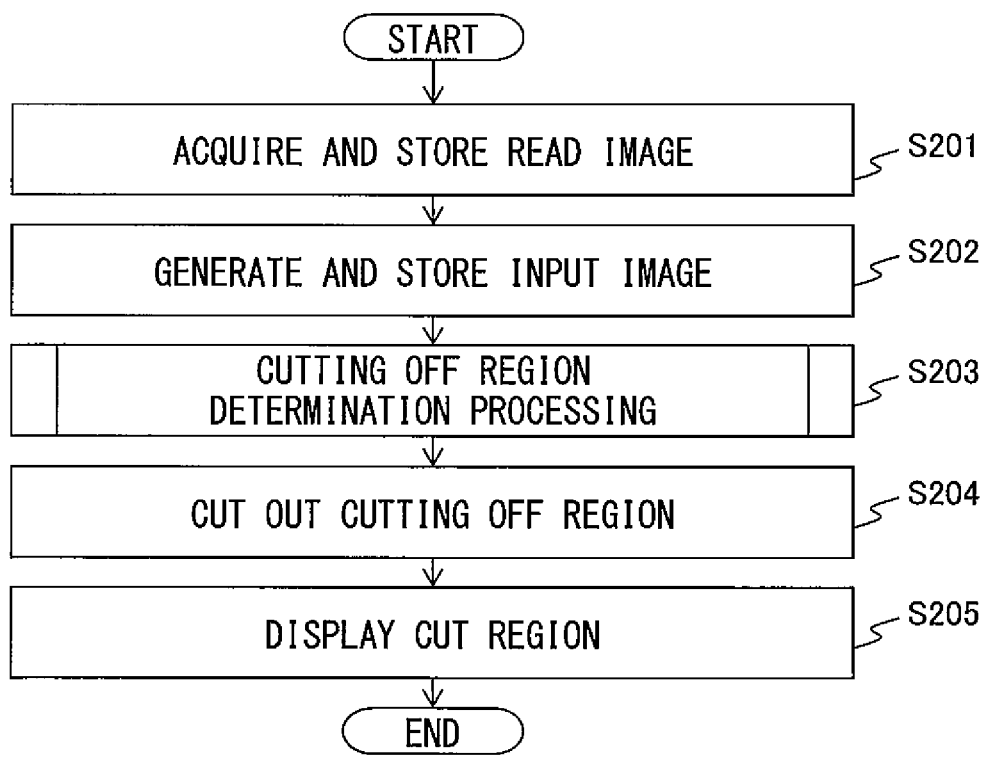
FIG. 4 is a flowchart illustrating an operation of document cutting processing.

FIG. 4 is a flowchart illustrating an operation of document cutting processing by the information processing apparatus 20. With reference to the flowchart illustrated in FIG. 4, the operation of document cutting processing is described below. The operation flow described below is executed mainly by the second CPU 26 based on a program previously stored on the second storage device 25 in collaboration with each element of the information processing apparatus 20.

Initially, the second CPU 26 acquires a read image from the image reading apparatus 10 via the second interface device 21 and stores the image on the second image memory 22 (step S201).

Subsequently, the image processing circuit 27 reads the read image stored on the second image memory 22, generates an input image where pixels are decimated horizontally and vertically with respect to a brightness component of the read image, and stores the input image on the second image memory 22 (step S202).

In general, since a processing rate of the information processing apparatus 20 largely varies based on the number of pixels of an image to be processed, a decimating rate of pixels is determined based on processing capabilities of the second CPU 26 and others and a processing rate needed for the information processing apparatus 20. Herein, when necessary processing rate is satisfied without decimating pixels, a brightness component of a read image is employable as an input image as is.

Then, each unit of the image processing circuit 27 executes cutting off region determination processing with respect to the input image (step S203). In the cutting off region determination processing, each unit of the image processing circuit 27 determines a cutting off region of a document from the input image. The cutting off region determination processing will be described in detail later.

Then, the cutting module 207 cuts out the cutting off region determined in the cutting off region determination processing from the input image (step S204).

Then, the second CPU 26 displays the region cut out by the cutting module 207 on the display device 23 (step S205) and ends a series of steps.

Figure 5:
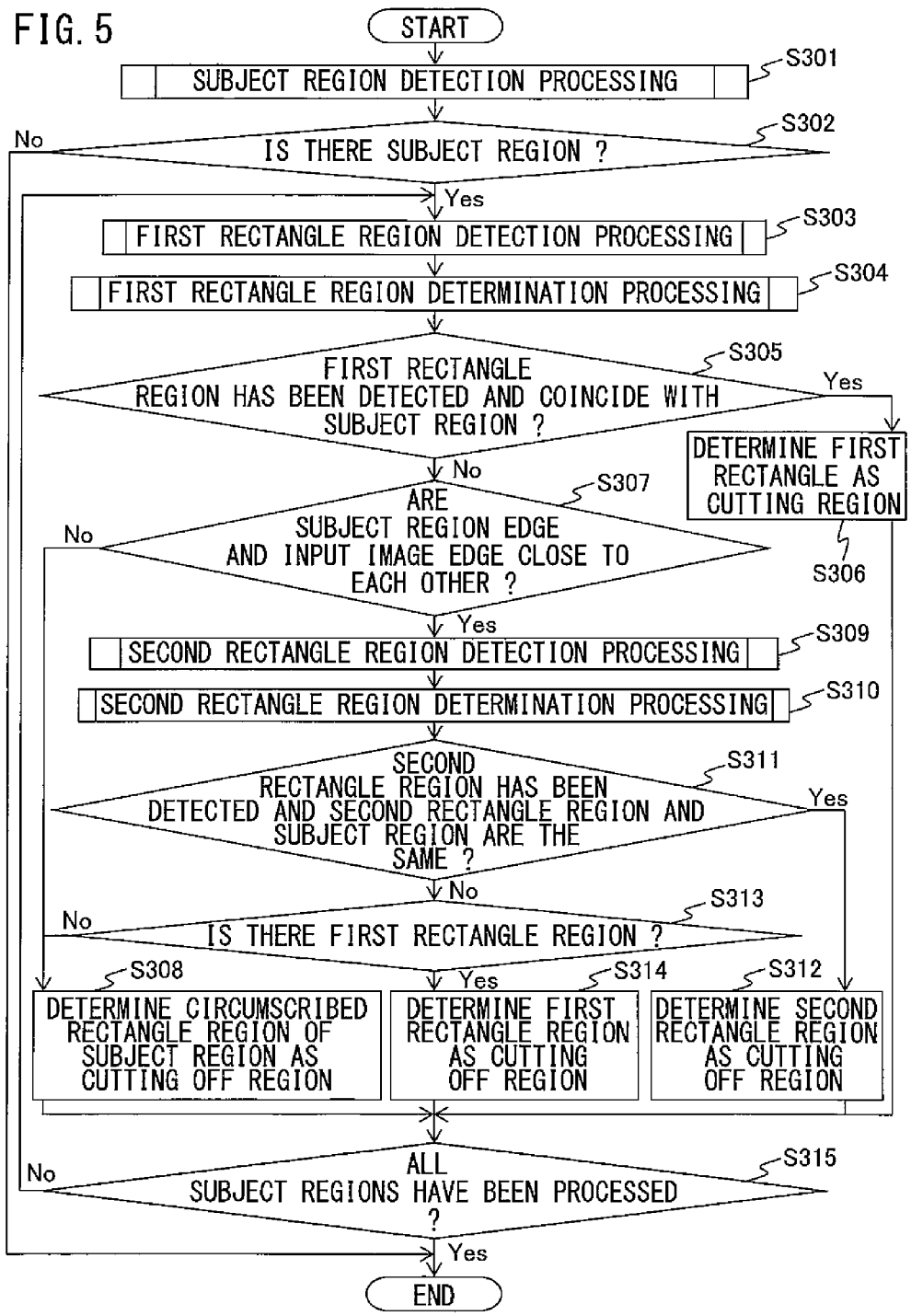
FIG. 5 is a flowchart illustrating an example of an operation of cutting off region determination processing.

FIG. 5 is a flowchart illustrating an example of an operation of cutting off region determination processing. The operation flow illustrated in FIG. 5 is executed in step S203 of the flowchart illustrated in FIG. 4.

Initially, the first edge pixel extractor 201 and the region detector 202 execute subject region detection processing with respect to an input image (step S301). In the subject region detection processing, the first edge pixel extractor 201 extracts edge pixels from the input image and the region detector 202 detects a subject region surrounded by connected edge pixels among the extracted edge pixels. The subject region detection processing will be described in detail later.

Then, the region detector 202 determines whether a subject region has been detected in the subject region detection processing (step S302). Upon no detection of any subject region at all, the region detector 202 does not specifically execute any processing and then a series of steps is ended. On the other hand, upon detection of a subject region, the processing is moved to step S303. Processing of step S303 to S315 is executed with respect to each extracted subject region.

Then, the second edge pixel extractor 203, the straight line detector 204, and the rectangle region detector 205 execute a first rectangle region detection processing with respect to the subject region (step S303). In the first rectangle region detection processing, the second edge pixel extractor 203 extracts edge pixels from the subject region, the straight line detector 204 detects a plurality of straight lines from the extracted edge pixels, and the rectangle region detector 205 detects a first rectangle region formed of four straight lines where two straight lines each are substantially at right angles to each other among the plurality of detected straight lines. The first rectangle region detection processing will be described in detail later.

Then, the region determination module 206 executes a first rectangle region determination processing with respect to the detected first rectangle region (step S304). In the first rectangle region determination processing, the region determination module 206 determines whether the first rectangle region and the subject region are the same. The first rectangle region determination processing will be described in detail later.

Then, the region determination module 206 determines whether the first rectangle region has been detected and also the first rectangle region and the subject region has been determined to be the same in the first rectangle region determination processing (step S305). The region determination module 206 determines the first rectangle region as a cutting off region when the first rectangle region has been detected and also the first rectangle region and the subject region has been determined to be the same (step S306).

On the other hand, the region determination module 206 determines whether an edge of the subject region is close to an edge of the input image when no first rectangle region has been detected or the first rectangle region and the subject region has been determined not to be the same (step S307). When any one of a left edge, a right edge, an upper edge, or a lower edge of the subject region falls within a predetermined distance from a left edge, a right edge, an upper edge, or a lower edge of the input image, the region determination module 206 determines that the edge of the subject region and the edge of the input image are close to each other; and in the case of more than the predetermined distance, both are determined not to be close to each other. The predetermined distance is determined as a maximum distance from an edge of an input image having possibility of no extraction of edge pixels while a subject imaged in a subject region meets the edge of the input image, the predetermined distance being determined as a distance equivalent, for example, to 10 mm.

When the edge of the subject region and the edge of the input image are not close to each other, the region determination module 206 determines a circumscribed rectangle region of the subject region as a cutting off region (step S308). In this case, the region determination module 206 may be able to determine a region including at least the subject region as a cutting off region or the subject region itself as the cutting off region.

On the other hand, when the edge of the subject region and the edge of the input image are close to each other, the second edge pixel extractor 203, the straight line detector 204, and the rectangle region detector 205 execute a second rectangle region detection processing with respect to the subject region (step S309). In the second rectangle region detection processing, in addition to the straight lines detected in the first rectangle region detection processing, the straight line detector 204 detects an edge of the input image close to an edge of the subject region as a straight line and the rectangle region detector 205 detects a second rectangle region formed of four straight lines including the edge of the input image. The second rectangle region detection processing will be described in detail later.

Then, the region determination module 206 executes a second rectangle region determination processing with respect to the detected second rectangle region (step S310). In the second rectangle region determination processing, the region determination module 206 determines whether the second rectangle region and the subject region are the same. The second rectangle region determination processing will be described in detail later.

Then, the region determination module 206 determines whether the second rectangle region has been detected and also the second rectangle region and the subject region has been determined to be the same in the second rectangle region determination processing (step S311). When the second rectangle region has been detected and also the second rectangle region and the subject region has been determined to be the same, the region determination module 206 determines the second rectangle region as a cutting off region (step S312).

On the other hand, the region determination module 206 determines whether the first rectangle region has been detected in the first rectangle region detection processing when no second rectangle region has been detected or the second rectangle region and the subject region has been determined not to be the same (step S313). When the first rectangle region has been detected, the region determination module 206 determines the first rectangle region as a cutting off region (step S314), and upon no detection of the first rectangle region, a circumscribed rectangle region of the subject region is determined as a cutting off region (step S308).

When the cutting off region has been determined in step S306, S308, S312, or S314, the image processing circuit 27 determines whether all subject regions have been processed (step S315). When an unprocessed subject region remains, the image processing circuit 27 returns the processing to step S303, repeats the processing of step S303 to S315, and ends a series of steps when all the subject regions have been processed.

FIG. 6 is a flowchart illustrating an example of an operation of subject region detection processing. The operation flow illustrated in FIG. 6 is executed in step S301 of the flowchart illustrated in FIG. 5.

Initially, the first edge pixel extractor 201 generates a reduced image where pixels are decimated horizontally and vertically from an input image and stores the reduced image on the second image memory 22 (step S401).

Figure 7A:
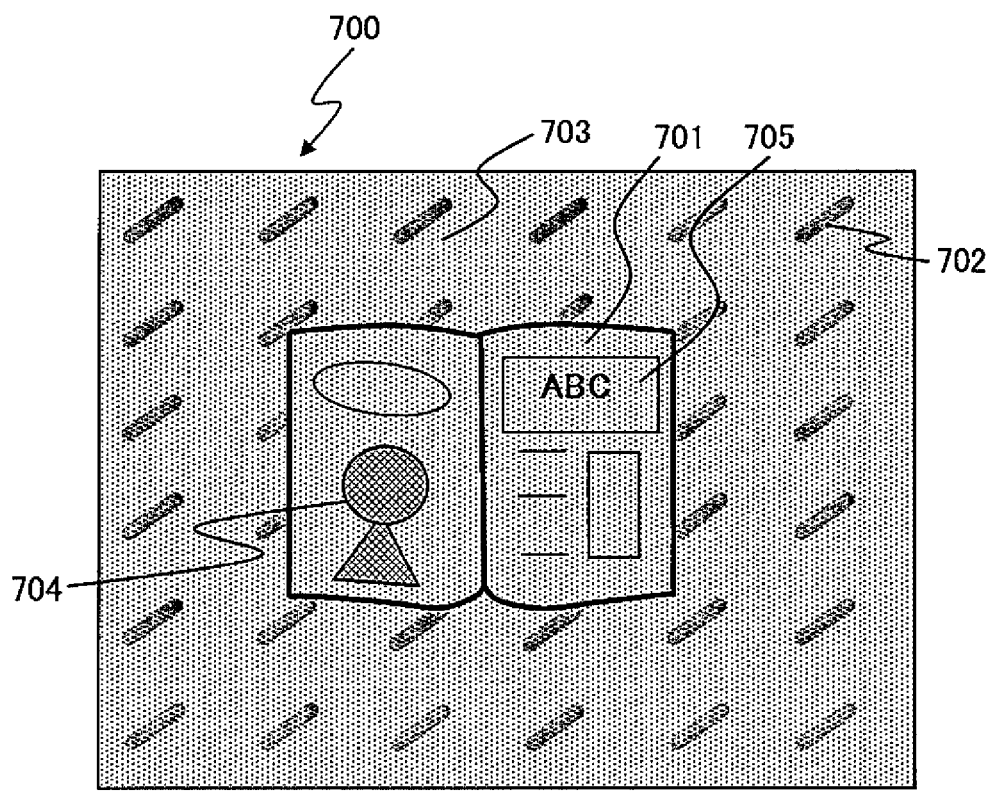
FIG. 7A illustrates an example of an input image.
Figure 7B:
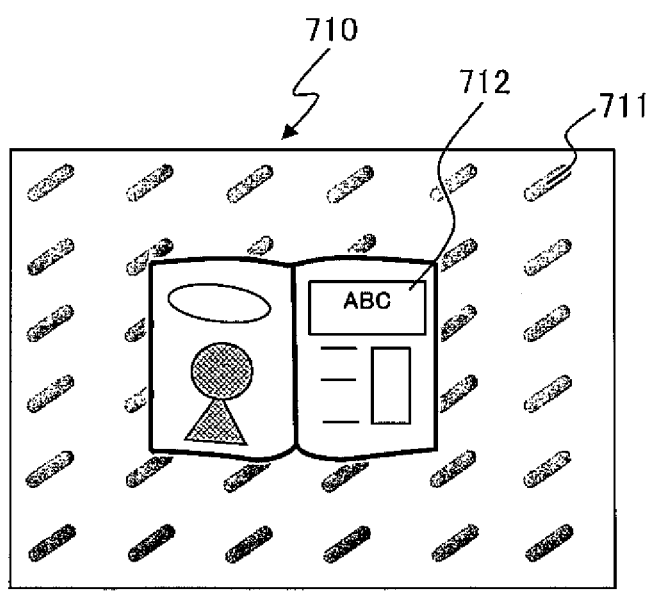
FIG. 7B illustrates an example of a reduced image.
Figure 7C:
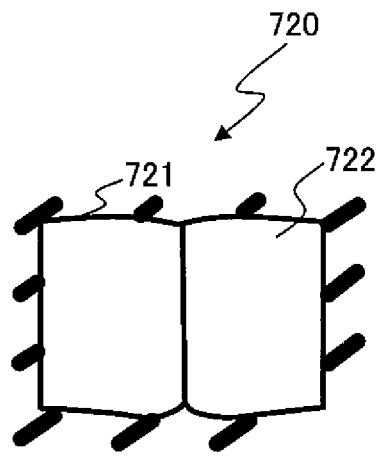
FIG. 7C illustrates an example of a region surrounded by connected edge pixels.

FIG. 7A to FIG. 7C are schematic views for illustrating each image in subject region detection processing. An image 700 illustrated in FIG. 7A is an example of an input image. As illustrated in FIG. 7A, the input image 700 is an image obtained by imaging, as a document, a book 701 placed on a desk having a pattern 702 such as woodgrain and the like. An image 710 illustrated in FIG. 7B is an example of a reduced image. A decimating rate from the input image 700 to the reduced image 710 is previously determined so as not to remove a shaded portion 704, a character 705, and others in the document, while random noise 703 generated due to influences of the imaging element and the optical system of the image input device 11 of the image reading apparatus 10 is eliminated.

Herein, the first edge pixel extractor 201 may be able to remove the random noise 703 by applying a smoothing filter to the input image instead of generating the reduced image. Alternatively, the first edge pixel extractor 201 possibly further applies the smoothing filter to the reduced image.

Then, the first edge pixel extractor 201 extracts edge pixels in horizontal and vertical directions from the reduced image. The first edge pixel extractor 201 generates a first edge image including pixels extracted as edge pixels in any one of the horizontal and vertical directions of the reduced image and stores the first edge image on the second image memory 22 (step S402).

The first edge pixel extractor 201 calculates an absolute value of a difference between brightness values of both neighboring pixels in a horizontal direction of each pixel of the reduced image (hereinafter, referred to as a neighboring difference value) and designates the pixel on the image as a vertical edge pixel when the neighboring difference value exceeds a threshold value Th1. It is possible to set this threshold value Th1 as a difference in brightness value (for example, 20) where, for example, people can visually discriminate a brightness difference on an image. Further, the first edge pixel extractor 201 executes the same processing for each image in the vertical direction and extracts horizontal edge pixels. Herein, it is possible that a variance value of a targeted pixel and pixels adjacent to the targeted pixel in horizontal, vertical, and oblique directions (eight neighborhoods) is designated as a variance value with respect to the targeted pixel and thereby the first edge pixel extractor 201 extracts vertical edge pixels and horizontal edge pixels from a neighboring difference value with respect to a variance value of the respective pixels.

The first edge pixel extractor 201 may be able to group the extracted vertical edge pixels and horizontal edge pixels by labeling each pixel and removes edge pixels contained in a group where a size of the horizontal direction or a size of the vertical direction is at most a threshold value Th2. The threshold value Th2 is set as a value (for example, a value equivalent to 3 mm) assumed to result from dirt or smudges on the placement surface of a document. Further, when an area of each group or an area of a circumscribed rectangle region thereof is at most the threshold value, the first edge pixel extractor 201 may be able to remove edge pixels contained in the group. Thereby, edge pixels generated due to dirt or smudges of the placement surface of the document are able to be removed.

The first edge pixel extractor 201 generates, as a first edge image, an image including pixels extracted as vertical edge pixels or horizontal edge pixels in the reduced image. Herein, the first edge pixel extractor 201 may be able to execute expansion/contraction processing for the generated first edge image. Thereby, even when a connected portion in the input image is not partially extracted as edge pixels, the portion can be connected in the first edge image.

Then, the region detector 202 determines whether each edge pixel is connected to another edge pixel in the first edge image and labels connected edge pixels as one group (step S403). The region detector 202 determines edge pixels adjacent to each other in the horizontal, vertical, or oblique directions (eight neighborhoods) to be connected. Herein, the first edge pixel extractor 201 may be able to determine edge pixels adjacent to each other only in the horizontal or vertical direction (four neighborhoods) to be connected.

Then, the region detector 202 determines whether both sizes of each group in the horizontal and vertical directions are at most a threshold value Th3 and removes, from the first edge image, edge pixels contained in a group where both sizes of the horizontal and vertical directions are at most the threshold value Th3 (step S404). The threshold value Th3 is set as a minimum size (for example, a value equivalent to 1 inch) of a document where the information processing apparatus 40 ensures detection. This processing removes a group of edge pixels having a smaller size than the minimum size of the document where the information processing apparatus 40 ensures detection, as illustrated as a pattern 711 of a desk illustrated in FIG. 7B. When a size in any one of the horizontal and vertical directions of each group is at most the threshold value Th3 or when an area of each group or an area of a circumscribed rectangle region thereof is at most a threshold value (for example, a value equivalent to 1 square inch), the region detector 202 may be able to remove edge pixels.

Then, the region detector 202 determines whether each group is included in another group and removes, from the first edge image, edge pixels contained in a group included in another group (step S405). This processing removes a group of edge pixels based on a content in the document, as illustrated as a content 712 illustrated in FIG. 7B.

Then, with respect to each remaining group having not been removed, the region detector 202 detects a region surrounded by edge pixels contained in the group and then detects, as a subject region, a region in the input image corresponding to the detected region. The region detector 202 stores a circumscribed rectangle region of the subject region in the input image on the second image memory 22 (step S406) and then a series of steps is ended.

An image 720 illustrated in FIG. 7C is an example of a region surrounded by connected edge pixels. As illustrated in FIG. 7C, the region 720 surrounded by connected edge pixels is a region including an outermost outer circumference 721 of the group of connected edge pixels and an inside thereof and includes not only the edge pixels but also all pixels 722 present inside the outer circumference 721.

A region that does not include the outermost outer circumference of the group of the connected edge pixels may be designated as the region surrounded by connected edge pixels. Alternatively, a region where the outermost outer circumference of the group of the connected edge pixels and the region of the inside thereof are expanded or contracted by a predetermined number of pixels may be designated as the region surrounded by connected edge pixels. Further, with respect to the connected edge pixels, the edge image may be subjected to expansion/contraction processing as described above and thereby, in addition to edge pixels adjacent to each other, edge pixels mutually located within a predetermined distance and pixels located therebetween are included. Still further, when edge pixels located at both edges of connected edge pixels are present within the predetermined distance, pixels located between the edge pixels of both edges may be included in the connected edge pixels. This predetermined distance may be designated, for example, as a length obtained by multiplying a length of connected edge pixels by a predetermined rate (for example, 80%). Thereby, for example, when edge pixels are connected together in a U-shaped manner, a region surrounded by connecting edge pixels of both edges is able to be formed.

Figure 8:
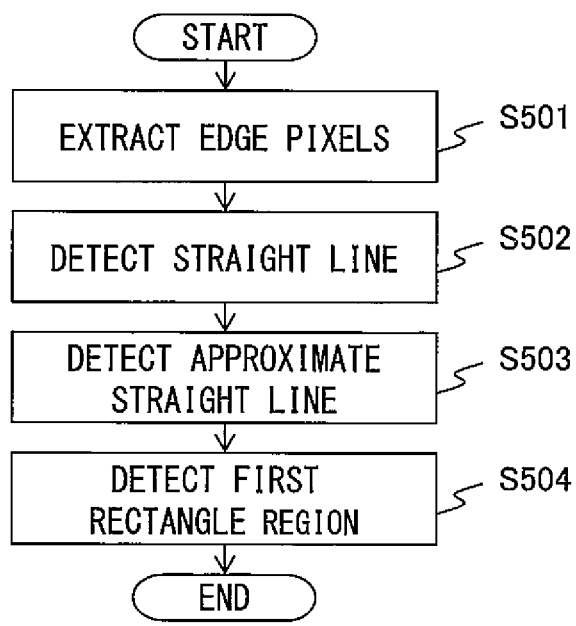
FIG. 8 is a flowchart illustrating an example of an operation of a first rectangle region detection processing.

FIG. 8 is a flowchart illustrating an example of an operation of a first rectangle region detection processing. The operation flow illustrated in FIG. 8 is executed in step S303 of the flowchart illustrated in FIG. 5.

Initially, the second edge pixel extractor 203 extracts vertical edge pixels and horizontal edge pixels in a circumscribed rectangle region of a subject region detected by the region detector 202 (step S501). The second edge pixel extractor 203 extracts the vertical edge pixels and the horizontal edge pixels in the same manner as in the case of generating the first edge image. Herein, in the same manner as in the case of generating the first edge image, the second edge pixel extractor 203 may be able to extract vertical edge pixels and horizontal edge pixels from a reduced image. Further, the second edge pixel extractor 203 may be able to group the extracted vertical and horizontal edge pixels by labeling each pixel and to remove edge pixels contained in a group having a size being at most the threshold value Th2.

Alternatively, the second edge pixel extractor 203 may be able to extract vertical edge pixels and horizontal edge pixels using another method. For example, the second edge pixel extractor 203 generates a plurality of decimated images where pixels are decimated at decimating rates differing from each other from an input image and then extracts vertical edge pixels from the input image and the respective decimated images each to generate an edge image including vertical edge pixels. The second edge pixel extractor 203 enlarges an edge image generated from the least decimated image at the same resolution as an edge image generated from its next-least decimated image and generates an image including vertical edge pixels present in the same position in the two edge images allowed to have the same resolution. The second edge pixel extractor 203 repeats the same processing with respect to the generated image and the edge image generated from the next-least decimated image and finally extracts vertical edge pixels present in the same position as the vertical edge pixels of the edge image generated from the input image. Further, the second edge pixel extractor 203 extracts horizontal edge pixels based on the same processing. Thereby, with reduction of noise, vertical and horizontal edge pixels are able to be extracted.

Then, the straight line detector 204 detects a plurality of straight lines each from an edge image generated from the horizontal edge pixels (hereinafter, referred to as a horizontal edge image) and an edge image generated from the vertical edge pixels (hereinafter, referred to as a vertical edge image) (step S502). Herein, a straight line extending horizontally is detected from the horizontal edge image and a straight line extending vertically is detected from the vertical edge image.

The straight line detector 204 detects a straight line using Hough transform. The straight line detector 204 may be able to detect a straight line using a least-square method. Alternatively, The straight line detector 204 may be able to detect a straight line by applying a least-square method to edge pixels present within a predetermined distance from the straight line detected using Hough transform. This predetermined distance is appropriately set based on an environment and others where the image processing system 1 is used, being set to be, for example, a distance equivalent to 2 mm.

Then, the straight line detector 204 detects approximate straight lines each from the horizontal edge image and the vertical edge image (step S503).

Figure 9A:
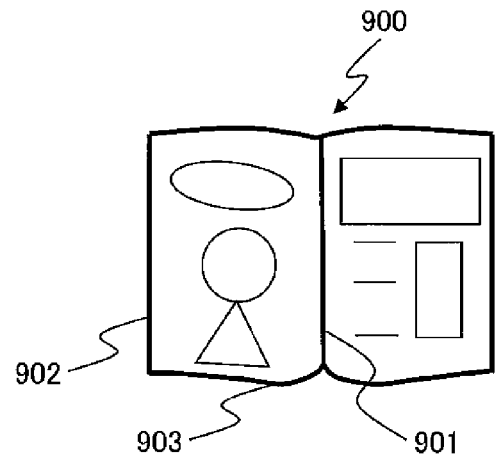
FIG. 9A is a schematic view for illustrating an approximate straight line.
Figure 9B:
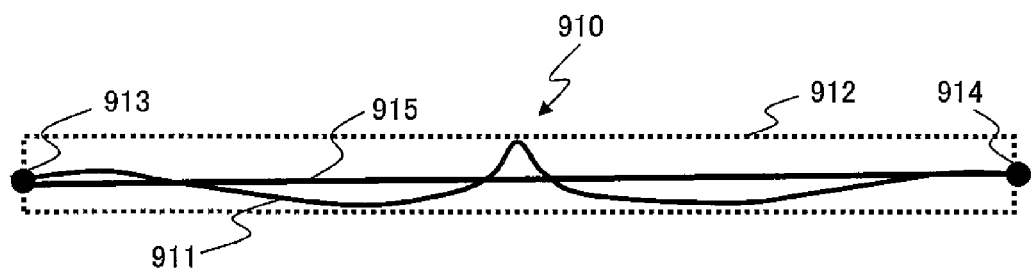
FIG. 9B is a schematic view for illustrating an approximate straight line.

FIG. 9A and FIG. 9B are schematic views for illustrating an approximate straight line. In an input image 900 where a book document as illustrated in FIG. 9A is imaged, an edge 902 parallel to a saddle-stitched portion 901 of the book document is detected as a straight line but in an edge 903 at right angles to the saddle-stitched portion 901, distortion occurs in a vicinity of the saddle-stitched portion 901, resulting in a possibility of no detection as a straight line.

Therefore, as illustrated in an edge image 910 of FIG. 9B, the straight line detector 204 brings together edge pixels 911 adjacent to each other as one group 912 by labelling. Of the edge pixels contained in the group 912, the straight line detector 204 detects, as an approximate straight line, a straight line 915 connecting an edge pixel 913 and an edge pixel 914 located at both edges in a horizontal or vertical direction.

Then, the rectangle region detector 205 detects a first rectangle region including straight lines or approximate lines detected by the straight line detector 204 (step S504).

The rectangle region detector 205 extracts a plurality of rectangle region candidates formed of four straight lines where two straight lines each are substantially at right angles to each other among a plurality of straight lines detected by the straight line detector 204. The rectangle region detector 205 initially selects one horizontal straight line (hereinafter, referred to as a first horizontal line) and then extracts a horizontal straight line (hereinafter, referred to as a second horizontal line) being substantially parallel (for example, at most ±3°) to the selected straight line and being distant by at least a threshold value Th4 therefrom. Then, the rectangle region detector 205 extracts a vertical straight line (hereinafter, referred to as a first vertical line) being substantially at right angles (for example, at most ±3° of 90°) to the first horizontal line. Then, the rectangle region detector 205 extracts a vertical straight line (hereinafter, referred to as a second vertical line) being substantially at right angles to the first horizontal line and being distant by at least a threshold value Th5 from the first vertical line. Herein, the threshold value Th4 and the threshold value Th5 are previously determined based on a size of a document serving as a subject to be read of the image reading apparatus 10 and both threshold values may be the same.

The rectangle region detector 205 extracts all combinations of the first horizontal line, the second horizontal line, the first vertical line, and the second vertical line satisfying the above conditions with respect to all straight lines detected by the straight line detector 204 and then extracts rectangle regions formed of the respective extracted combinations as rectangle region candidates. The rectangle region detector 205 calculates areas of the extracted rectangle region candidates and detects a rectangle region candidate having the largest area as a first rectangle region. Herein, the rectangle region detector 205 may be able to calculate, with respect to each rectangle region candidate, a ratio of the number of edge pixels present within a predetermined distance to the number of all pixels present within a predetermined distance (for example, a distance equivalent to 2 mm) from each side of a rectangle region candidate and then performs weighting by multiplying an area of the rectangle region candidate by the ratio. Thereby, a rectangle region formed of straight lines clearly expressing a border of the document is able to be detected. Alternatively, the rectangle region detector 205 may be able to calculate, with respect to each rectangle region candidate, an evaluation score representing a degree of corner appearance of each corner of a rectangle region candidate and performs weighting for an area of the rectangle region candidate using the evaluation score.

Figure 10:
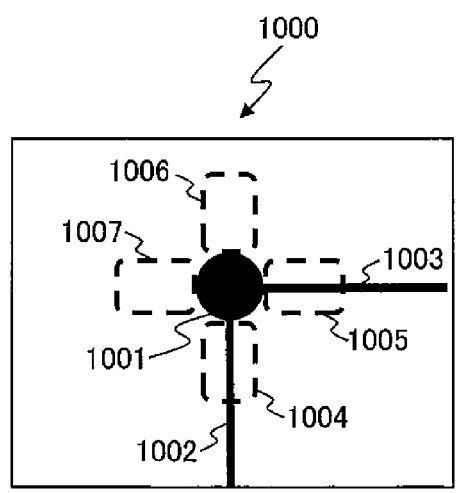
FIG. 10 is a schematic view for illustrating an evaluation score of each corner of a rectangle region candidate.

FIG. 10 is a schematic view for illustrating an evaluation score of each corner of a rectangle region candidate. In an image 1000 illustrated in FIG. 10, a point 1001 represents a corner of a rectangle region candidate and straight lines 1002 and 1003 represent respective sides of the rectangle region candidate. When edges of these straight lines 1002 and 1003 are in contact with each other, the point 1001 is determined to look like a corner of a rectangle region. However, when the edges of the straight lines 1002 and 1003 are not in contact with each other or the straight lines 1002 and 1003 intersect with each other, the point 1001 is considered not to look like a corner of a rectangle.

The basis of the evaluation score is designated as score 0. In a region 1004 within a predetermined distance from the side 1002 in a vicinity of the corner 1001, a determination is made whether edge pixels are present on each horizontal line, and when edge pixels are present on the horizontal line, score 1 is added to an evaluation score. Herein, a range in a vicinity of each corner and a predetermined distance from each side are appropriately determined based on an environment and others where the image processing system 1 is used, and it is possible to make settings, for example, as a range within a distance equivalent to 5 mm from each corner and a distance equivalent to 2 mm from each side. In the same manner, in a region 1005 within a predetermined distance from the side 1003 in a vicinity of the corner 1001, a determination is made whether edge pixels are present on each vertical line, and when edge pixels are present on the vertical line, score 1 is added to an evaluation score. Further, in a region 1006 within a predetermined distance from an extension of the side 1002 in a vicinity of the corner 1001, a determination is made whether edge pixels are present on each horizontal line, and when edge pixels are present on the horizontal line, score 1 is subtracted from an evaluation score. In the same manner, in a region 1007 within a predetermined distance from an extension of the side 1003 in a vicinity of the corner 1001, a determination is made whether edge pixels are present on each vertical line, and when edge pixels are present on the vertical line, score 1 is subtracted from an evaluation score. The rectangle region detector 205 calculates a value where the evaluation score is normalized so that a possible minimum value of the evaluation score is 0 and a possible maximum value thereof is 1 and performs weighting by multiplying an area of a rectangle region candidate by the value, and thereby, a rectangle clearly expressing the four corners can be detected.

Herein, when any one of the sides of the detected rectangle region is an approximate straight line, the rectangle region detector 205 corrects the side based on the approximate straight line so that all edge pixels contained in a labeled group corresponding to the approximate straight line are contained in the rectangle region.

Figure 11A:
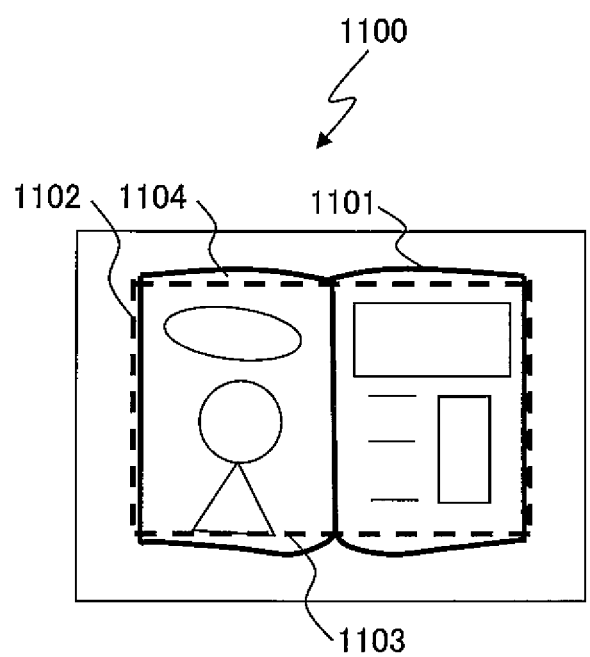
FIG. 11A is a schematic view for illustrating a rectangle region including approximate straight lines.
Figure 11B:
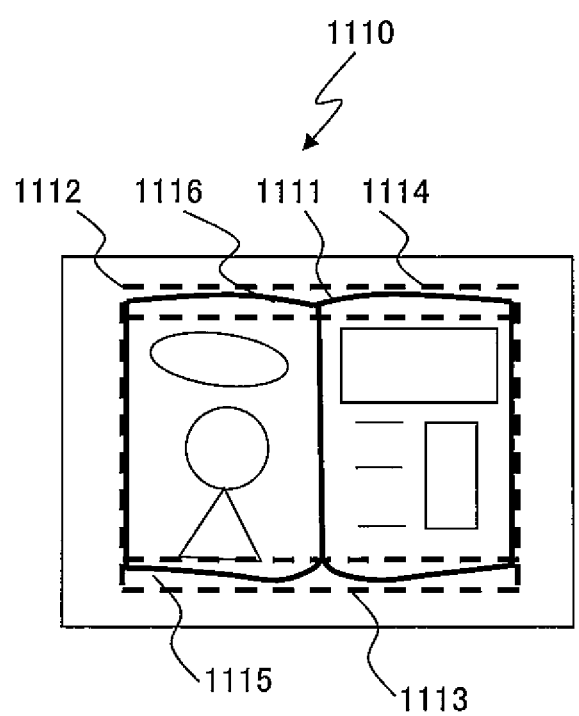
FIG. 11B is a schematic view for illustrating a rectangle region including approximate straight lines.

FIG. 11A and FIG. 11B are schematic views for illustrating a rectangle region including approximate straight lines. As illustrated in an image 1100 of FIG. 11A, when sides 1103 and 1104 of a rectangle region 1102 detected with respect to a document 1101 are approximate straight lines, there is a possibility that the approximate straight lines 1103 and 1104 overlap with the document 1101 and thereby the rectangle region 1102 does not include the entire region of the document 1101. Therefore, as illustrated in an image 1110 of FIG. 11B, the rectangle region detector 205 corrects the approximate straight lines 1103 and 1104 to sides 1113 and 1114 being substantially parallel to the respective approximate straight lines and located on an outside when viewed from the document 1111 among the sides constituting circumscribed rectangle regions of groups 1115 and 1116 corresponding to the respective approximate straight lines. This makes it possible for the rectangle region 1102 to be corrected to a rectangle region 1112 and then the entire region of the document 1111 is contained therein.

Figure 12:
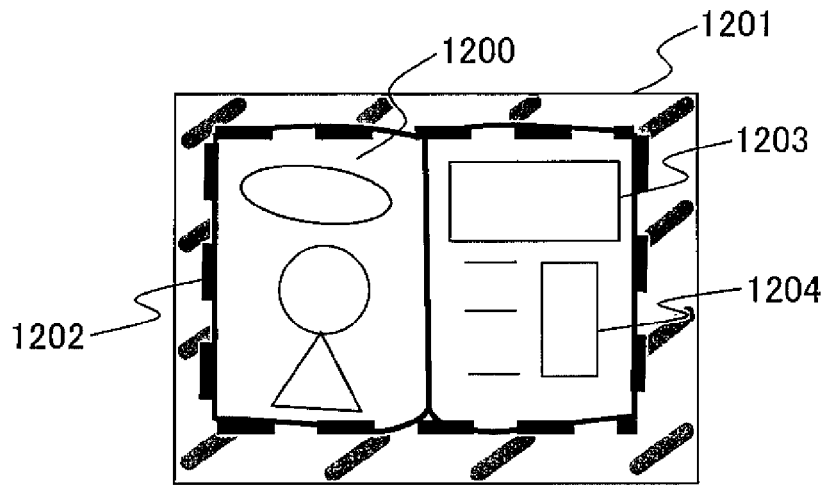
FIG. 12 is a schematic view illustrating an example of a first rectangle region detected by a rectangle region detector.

FIG. 12 is a schematic view illustrating an example of a first rectangle region detected by the rectangle region detector 205. In the example illustrated in FIG. 12, in a circumscribed rectangle region 1201 of a subject region 1200, rectangle regions 1202 to 1204 are detected as rectangle region candidates and of these, the rectangle region 1202 having the largest area is detected as a first rectangle region.

Figure 13:
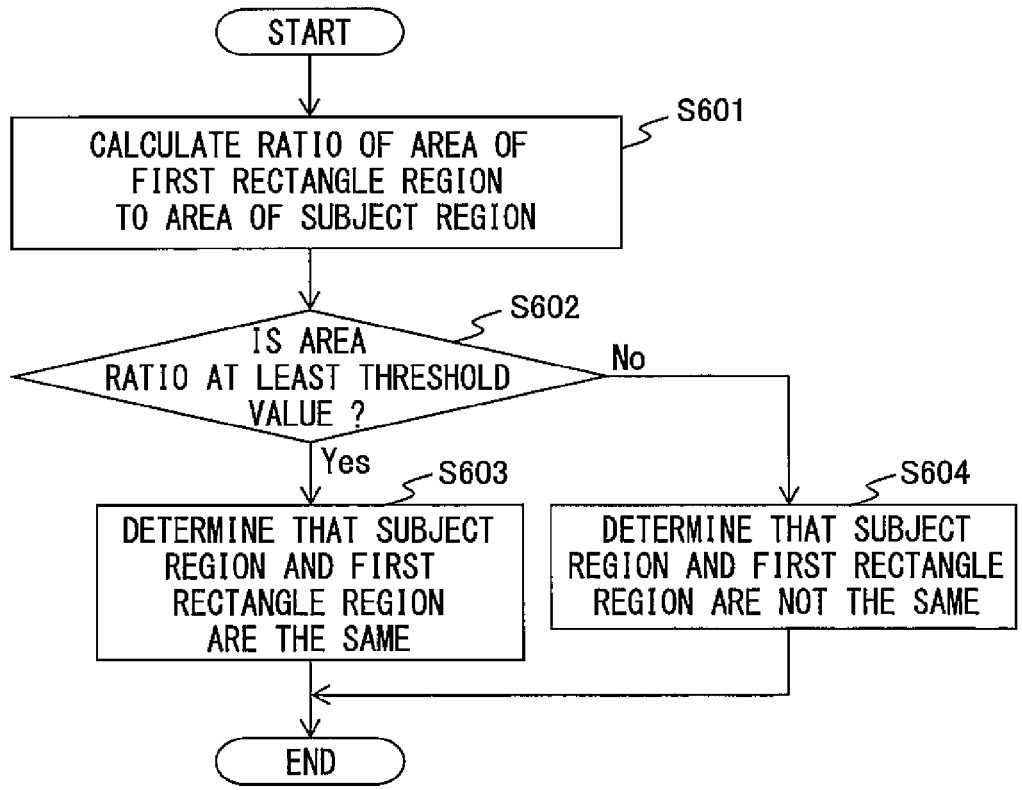
FIG. 13 is a flowchart illustrating an example of an operation of a first rectangle region determination processing.

FIG. 13 is a flowchart illustrating an example of an operation of a first rectangle region determination processing. The operation flow illustrated in FIG. 13 is executed in step S304 of the flowchart illustrated in FIG. 5.

Initially, the region determination module 206 calculates a ratio of an area of the first rectangle region detected by the rectangle region detector 205 to an area of the subject region detected by the region detector 202 (step S601).

Then, the region determination module 206 determines whether the calculated area ratio is at least a threshold value Th6 (step S602). When the calculated area ratio is at least the threshold value Th6, the region determination module 206 determines that the subject region and the first rectangle region are the same (step S603), and on the other hand, determines that the subject region and the first rectangle region are not the same (step S604) in the case of less than the threshold value Th6. Then, a series of steps is ended.

In this manner, the concept "a subject region and a rectangle region are the same" includes not only the concept that the subject region and the rectangle region are completely the same but also the concept that both are substantially the same, and means that a ratio of a size of the rectangle region to a size of the subject region is at least a preset threshold value Th6. The threshold value Th6 is set as a value larger than at least 0.5 (for example, 0.8). The threshold value Th6 is set to be, for example, a ratio of an assumed size of a document to a total value of the assumed size of the document as a subject to be read and an assumed maximum size as a pattern of the placement table of the document.

Herein, the sizes of the subject region and the rectangle region for determining the ratio are not limited to their areas, and an area of a circumscribed rectangle region or a length of a horizontal or vertical direction of the circumscribed rectangle region is employable. Alternatively, when the shapes of the subject region and the rectangle region are substantially the same, the subject region and the rectangle region may be determined to be the same. In this case, when a rate of a ratio of the lengths of the horizontal and vertical directions of the rectangle region to a ratio of the lengths of the horizontal and vertical directions of the circumscribed rectangle region of the subject region falls within a predetermined range (for example, 0.8 to 1.0), the region determination module 206 determines that the subject region and the rectangle region are the same, and determines that both are not the same when the rate does not fall within the predetermined range. Further, the region determination module 206 may be able to determine whether the subject region and the rectangle region are the same using a combination of at least two of these values.

As described above, in the first rectangle region detection processing, the rectangle region detector 205 detects only one first rectangle region but may detect a plurality of first rectangle regions. In this case, in the first rectangle region determination processing, the region determination module 206 determines whether every detected first rectangle region and the subject region are the same. Then, in step S305 of FIG. 5, the region determination module 206 determines whether a determination whether every detected first rectangle region and the subject region are the same has been made, and when any one of the first rectangle regions and the subject region are not the same, the processing is moved to step S306.

An operation of a second rectangle region detection processing executed in step S309 of FIG. 5 will be described below.

The operation of the second rectangle region detection processing is substantially the same as the operation of the first rectangle region detection processing illustrated in FIG. 8. However, in step S502 of FIG. 8, in addition to the straight lines detected in the first rectangle region detection processing, the straight line detector 204 detects, as a straight line, an edge of the input image determined to be close to an edge of the subject region by the region determination module 206 in step S308 of FIG. 5. Then, in step S504 of FIG. 8, the rectangle region detector 205 detects a second rectangle region formed of four straight lines including at least the edge of the input image detected as the straight line.

Figure 14:
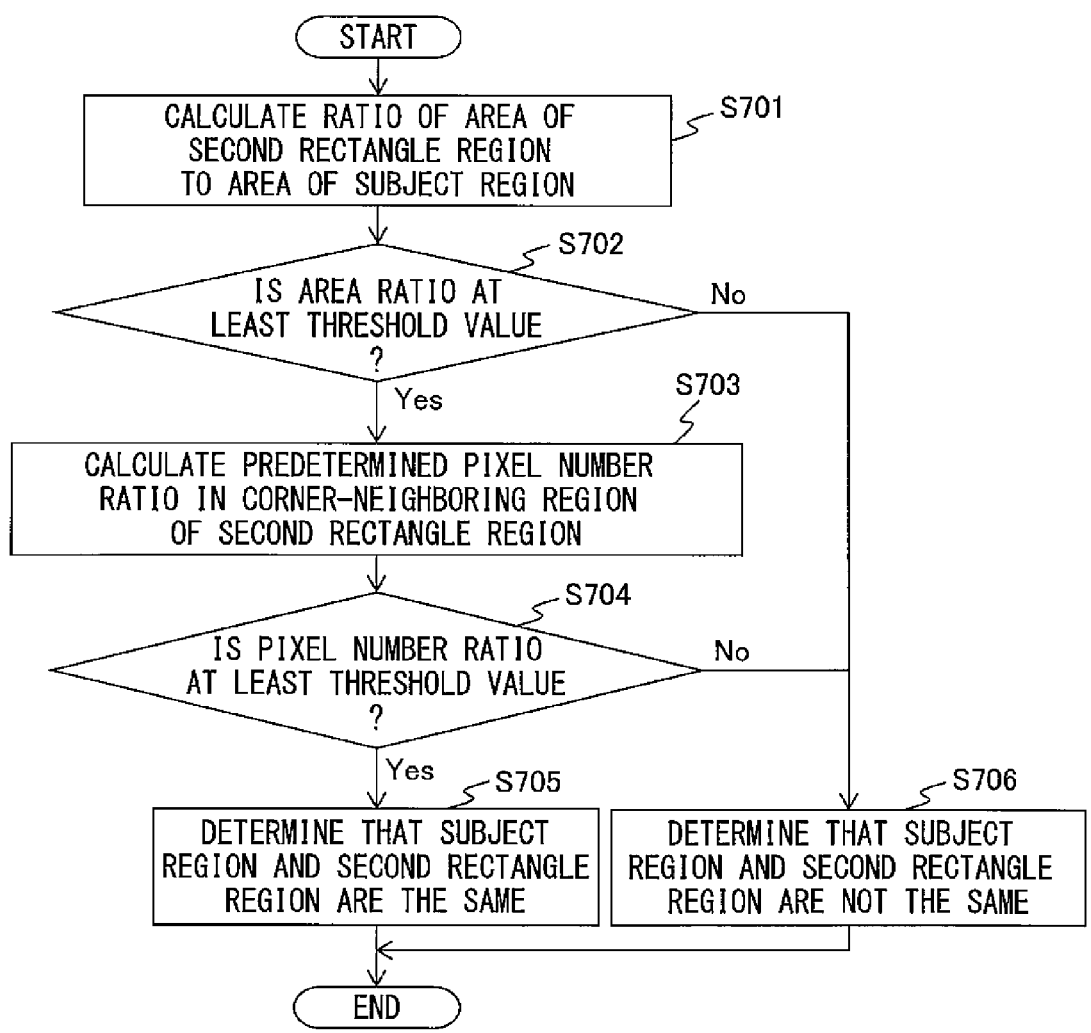
FIG. 14 is a flowchart illustrating an example of an operation of a second rectangle region determination processing.

FIG. 14 is a flowchart illustrating an example of the operation of the second rectangle region determination processing. The operation flow illustrated in FIG. 14 is executed in step S310 of the flowchart illustrated in FIG. 5.

Initially, the region determination module 206 calculates a ratio of an area of the second rectangle region detected by the rectangle region detector 205 to an area of the subject region detected by the region detector 202 (step S701).

Subsequently, the region determination module 206 determines whether the calculated area ratio is at least a threshold value Th7 (step S702). The threshold value Th7 is set as a value larger than at least 0.5 (for example, 0.8) in the same manner as for the threshold value Th6 and preset as a ratio of an assumed size of a document to a total value of the assumed size of the document as a subject to be read and an assumed maximum size as a pattern of the placement table of the document. Herein, the region determination module 206 may be able to compare the subject region and the second rectangle region using a value other than the area ratio in the same manner as in the first rectangle region determination processing.

When the calculated area ratio is at least the threshold value Th7, the region determination module 206 detects a neighboring region of a corner of a second rectangle region meeting an edge of an input image along a side of the second rectangle region substantially at right angles to the edge of the input image. The region determination module 206 calculates a ratio of the number of pixels where edge pixels are present in a direction at right angles to the side of the second rectangle region among the pixels constituting the side to the number of the pixels constituting the side in the detected neighboring region (step S703).

Figure 15A:
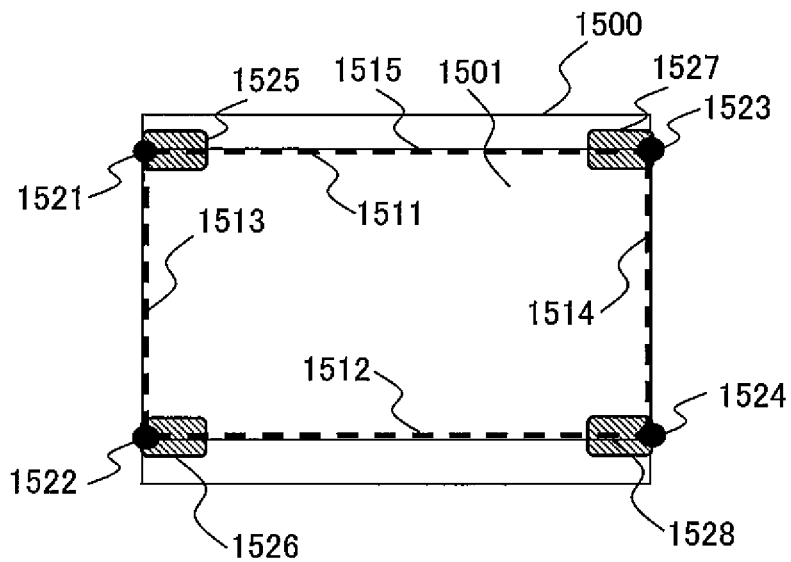
FIG. 15A is a schematic view for illustrating the second rectangle region determination processing.

FIG. 15A is a schematic view for illustrating the second rectangle region determination processing. In the example illustrated in FIG. 15A, a document 1501 is imaged so as not to fit within an input image 1500, and an upper edge 1511 and a lower edge 1512 of the document 1501 and a left edge 1513 and a right edge 1514 of the input image 1500 constitute a second rectangle region 1515.

The region determination module 206 initially detects a neighboring region 1525 of an upper left corner 1521 of the second rectangle region 1515 meeting the left edge 1513 of the input image 1500. The neighboring region is a region along the upper edge 1511 of the second rectangle region 1515 substantially at right angles to the left edge 1513 of the input image 1500. A length of a direction at right angles to the upper edge 1511 is determined as a length equivalent, for example, to 2 mm and a length of a direction parallel to the upper edge 1511 is determined as a length equivalent, for example, to 10 mm. With respect to each pixel constituting the upper edge 1511 of the second rectangle region 1515 in the neighboring region 1525, the region determination module 206 determines whether edge pixels are present on a line (substantially in a vertical direction) passing through the pixel and also being at right angles to the upper edge 1511. Then, the region determination module 206 calculates a ratio of the number of pixels where edge pixels have been determined to be present on the line at right angles to the upper edge 1511 among the pixels constituting the upper edge 1511 to the number of the pixels constituting the upper edge 1511.

In the same manner, the region determination module 206 detects a neighboring region 1526 of a lower left corner 1522 of the second rectangle region 1515 meeting the left edge 1513 of the input image 1500. Further, the region determination module 206 detects a neighboring region 1527 of an upper right corner 1523 of the second rectangle region 1515 meeting the right edge 1514 of the input image 1500 and a neighboring region 1528 of a lower right corner 1524. With respect to each neighboring region, the region determination module 206 calculates a ratio of the number of pixels where edge pixels are present on a line (substantially in a vertical direction) at right angles to each side (substantially in a horizontal direction) of the second rectangle region 1515 among the pixels constituting the each side to the number of the pixels constituting the each side.

When the left edge and the right edge of the document and the upper edge and the lower edge of the input image constitute the second rectangle region, the neighboring regions of the upper left corner and the lower left corner of the second rectangle region become regions along the left edge of the second rectangle region and the neighboring regions of the upper right corner and the lower right corner of the second rectangle region become regions along the right edge of the second rectangle region. In this case, with respect to each neighboring region, the region determination module 206 calculates a ratio of the number of pixels where edge pixels are present on a line (substantially in a horizontal direction) at right angles to each side (substantially in a vertical direction) of the second rectangle region among the pixels constituting the each side to the number of the pixels constituting the each side.

Then, the region determination module 206 determines whether the ratio of the number of pixels calculated with respect to each neighboring region is at least a threshold value Th8 (step S704). The threshold value Th8 is set as a value being able to discriminate whether an edge of the document is imaged in each neighboring region and set to be, for example, 0.8.

Figure 15B:
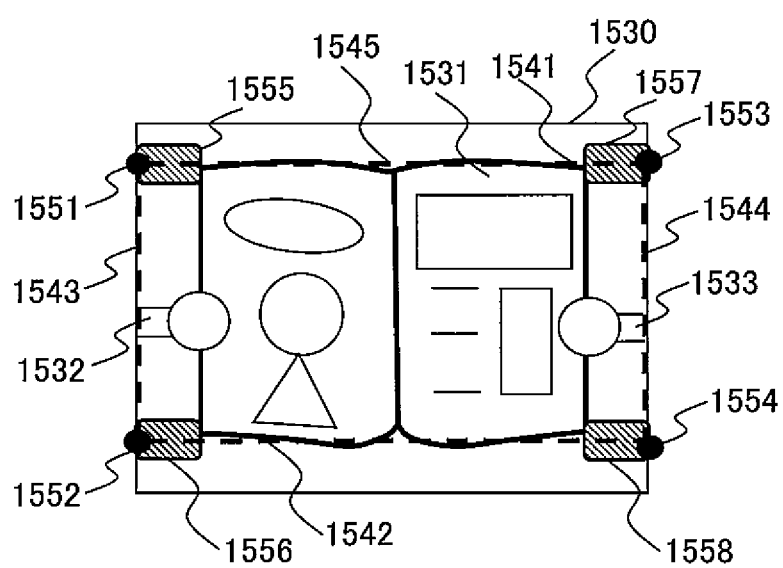
FIG. 15B is a schematic view for illustrating the second rectangle region determination processing.

FIG. 15B is a schematic view for illustrating the second rectangle region determination processing. In the example illustrated in FIG. 15B, a document 1531 fits within an input image 1530 but the document 1531 is pressed with the hands 1532 and 1533 of the user. In this example, an upper edge 1541 and a lower edge 1542 of the document 1531 and a left edge 1543 and a right edge 1544 of the input image 1530 constitute a second rectangle region 1545.

As illustrated in FIG. 15A, in the case where the document 1501 does not fit within the input image 1500 and thereby the second rectangle region 1515 is detected, since an edge of the document is imaged in each of the neighboring regions 1525 to 1528, a calculated pixel ratio becomes a value close to 1. On the other hand, as illustrated in FIG. 15B, in the case where the document 1531 does not directly continue into the input image 1530 but continuation is made via the hands of the user and others, since no edge of the document is imaged in each of the neighboring regions 1555 to 1558, the calculated pixel ratio becomes a value close to 0.

When all ratios of the number of pixels calculated in the respective neighboring regions are at least the threshold value Th8, the region determination module 206 determines that the subject region and the second rectangle region are the same (step S705) and then a series of steps is ended. On the other hand, when a ratio of the number of pixels calculated in any one of the neighboring regions is less than the threshold value Th8 or when an area ratio has been determined to be less than the threshold value Th7 in step S702, the region determination module 206 determines that the subject region and the second rectangle region are not the same (step S706) and then a series of steps is ended.

As described above, the region determination module 206 determines whether the second rectangle region and the subject region are the same based on edge pixels distributing along a side of the second rectangle region in a detected neighboring region. Herein, the region determination module 206 may be able to determine whether the second rectangle region and the subject region are the same based on whether a ratio of the number of edge pixels to the number of all pixels in the detected neighboring region is at least the threshold value.

States of the respective images in step S306, S308, S312, and S314 of FIG. 5 will be described below.

In step S306, since the first rectangle region and the subject region are the same, as illustrated in FIG. 12, it is conceivable that the first rectangle region is the rectangle region 1202 based on the document and the subject region is the subject region 1200 including the rectangle region 1202 based on the document and the pattern of the desk continuing into the rectangle region 1202. In this case, if the subject region is determined as a cutting off region, the pattern of the desk continuing into the document is included, and therefore, the region determination module 206 determines the first rectangle region 1202 as the cutting off region so that the cutting off region does not include the pattern of the desk. Thereby, the information processing apparatus 20 is able to appropriately cut out only a portion where a document is imaged even when there is a pattern in the placement table of the document.

On the other hand, in step S308, since the first rectangle region and the subject region are not the same, it is conceivable that a non-rectangular document has been detected as the subject region. In this case, the region determination module 206 determines a circumscribed rectangle region of the subject region as a cutting off region and then allows the cutting off region to include the entire non-rectangular document. Thereby, the information processing apparatus 20 is able to cut out the entire document even if the document does not have a rectangular shape.

On the other hand, in step S312, the second rectangle region and the subject region are the same. In this case, as illustrated in FIG. 15A, it is conceivable that the document 1501 does not fit within the input image 1500 and then the subject region based on the document 1501 meets the edges 1513 and 1514 of the input image 1500 and the second rectangle region 1515 are the same. In this case, the region determination module 206 determines the second rectangle region 1515 as a cutting off region and allows the cutting off region to include the entire document where the input image is imaged. Thereby, the information processing apparatus 20 is able to inhibit a partial content in a document from being erroneously detected and cut out as the entire document even unless the document fits within the input image.

On the other hand, in step S314, although the first rectangle region and the second rectangle region, and the subject region are not the same, the subject region is close to an edge of the input image and also the first rectangle region exists. In this case, it is conceivable that the pattern of the desk continuing into the document meets the edge of the input image. In general, when a document is placed on a desk or others and imaged using an image reading apparatus, the user tends to place the document in a central position of an imaging range for imaging. Therefore, when a pattern of the desk continuing into the document meets an edge of an input image, the pattern of the desk is highly likely to span the entire imaging range.

Figure 16:
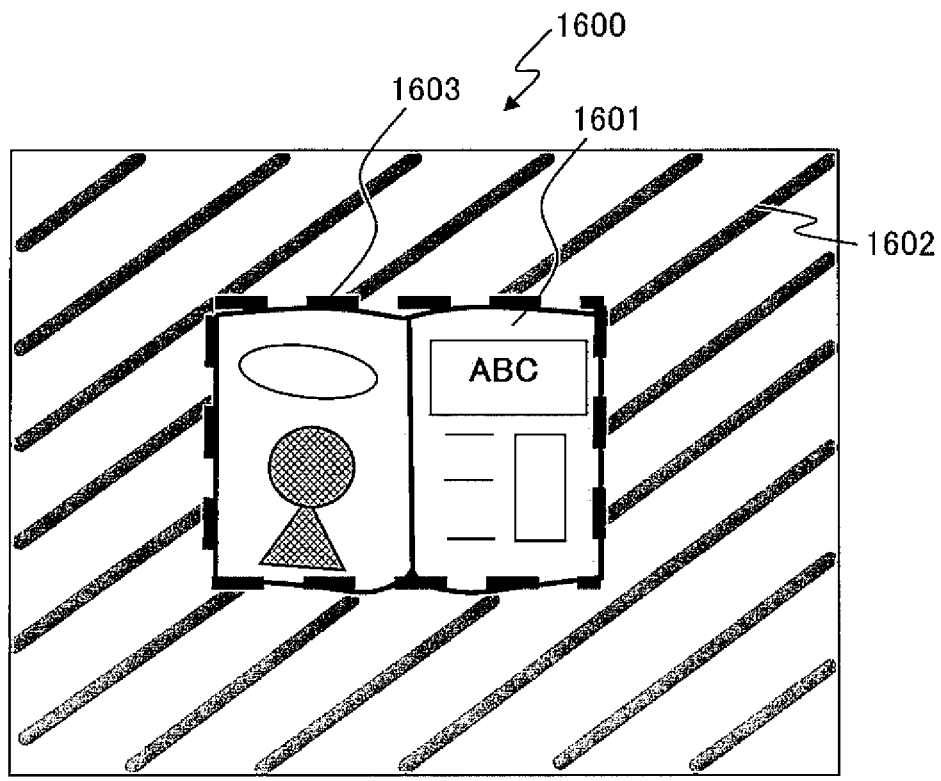
FIG. 16 is a view illustrating an example of an input image in the case where a pattern of a desk spans an entire imaging range.

FIG. 16 is a schematic view illustrating an example of an input image in the case where a pattern of a desk spans an entire imaging range. In the example illustrated in FIG. 16, a document 1601 is imaged in an input image 1600 and a pattern 1602 of the desk spans the entire input image 1600. In this case, the region determination module 206 determines a first rectangle region 1603 based on the document 1601 as a cutting off region so that the cutting off region does not include the pattern 1602 of the desk. Thereby, the information processing apparatus 20 is able to appropriately cut out only a portion where the document is imaged even when a pattern of the placement table of the document spans a wide range.

When the pixel number ratio has been determined not to be at least the threshold value Th8 in step S704 of FIG. 14 and then the processing has been moved to step S314, as illustrated in FIG. 15B, there is a high possibility that the subject region is formed by continuation of the document 1531 and the hands 1532 and 1533 of the user and others. Therefore, also in this case, the region determination module 206 determines the first rectangle region based on the document 1531 as a cutting off region so that the cutting off region includes the hands 1532 and 1533 of the user and others as little as possible. Thereby, the information processing apparatus 20 is able to appropriately cut out only a portion where a document is imaged even when the hands of the user and others are imaged in an input image.

Herein, in the case where although the first rectangle region and the second rectangle region, and the subject region are not the same, the subject region is close to an edge of the input image and also the first rectangle region exists, there is a possibility that a non-rectangular document having a rectangular pattern is imaged so as not to fit within the input image. Therefore, in this case, the region determination module 206 may be able to determine a circumscribed rectangle region of the subject region as a cutting off region so that the subject region includes the entire non-rectangular document.

As described in detail above, according to the operations in accordance with the flowcharts illustrated in FIG. 4 to FIG. 6, FIG. 8, FIG. 13, and FIG. 14, the information processing apparatus 20 has been able to appropriately determine cutting off region of a document from an input image.

In the case where a region surrounded by connected edge pixels is simply determined as a cutting off region, when the placement table of a document has a pattern, there is a possibility that the cutting off region may include the pattern of the placement table of the document continuing into the document. To prevent this, when the pattern of the placement table of the document is intended to be removed as noise, an edge of the document is possibly removed partially. However, the information processing apparatus 20 is able to appropriately determine a cutting off region via comparison of a subject region and a rectangle region within the subject region and to prevent the edge of the document from being removed since it is unnecessary to remove the pattern of the placement table of the document by noise removal processing.

A range for determining a cutting off region determined by the image processing circuit 27 may be input from the input device 24 by the user. In this case, each unit of the image processing circuit 27 detects a subject region and each straight line or rectangle region within the input range to determine a cutting off region.

Figure 17:
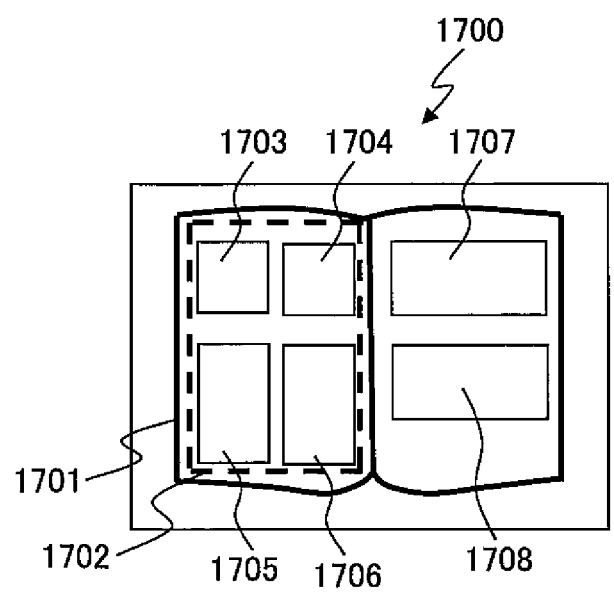
FIG. 17 is a schematic view for illustrating an assignment of a detection range.

FIG. 17 is a schematic view for illustrating processing when a range for determining a cutting off region is assigned. As illustrated in an image 1700 of FIG. 17, when a range 1702 within a document 1701 is assigned by the user, each of the regions 1703 to 1706 within the range 1702 is detected as a subject region and each of the regions 1707 and 1708 that is not included in the range 1702 is not detected as the subject region. Thereby, when an album or the like is imaged, the information processing apparatus 20 is also able to automatically cut out each photograph in the album. Further, when the range for determining a cutting off region is limited, it is possible to appropriately remove noise present outside a region to be cut out and then to appropriately determine the cutting off region.

Figure 18:
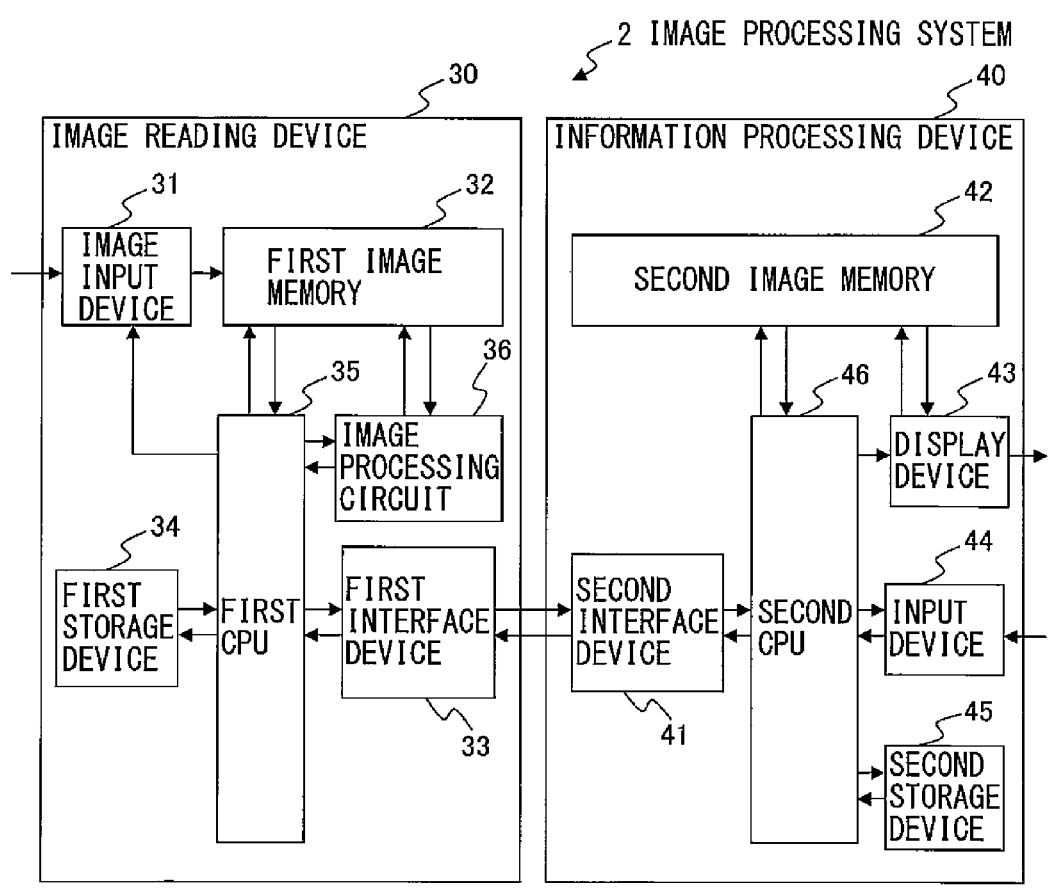
FIG. 18 is a schematic configurational diagram of an image processing system according to another embodiment.

FIG. 18 is a diagram illustrating a schematic configuration of an image processing system 2 according to another embodiment. A difference between the image processing system 2 illustrated in FIG. 18 and the image processing system 1 illustrated in FIG. 1 is that devices including an image processing circuit differ. In other words, in the image processing system 2, instead of an information processing apparatus 40, an image reading apparatus 30 includes an image processing circuit 36. This image processing circuit 36 has the same function as the image processing circuit 27 of the information processing apparatus 20.

The image processing system 2 illustrated in FIG. 18 is capable of executing substantially the same processing as the aforementioned processing illustrated in FIG. 3 and FIG. 4. Manners applied to the image reading processing illustrated in the flowchart of FIG. 3 and the straight line detection processing and the rectangle region detection processing illustrated in the flowchart of FIG. 4 are described below. In the image processing system 2, the processing of step S101 and the processing of step S202 to S204 are executed mainly by a first CPU 35 based on a program previously stored on a first storage device 34 in collaboration with each element of the image reading apparatus 30. On the other hand, the processing of step S205 is executed mainly by a second CPU 46 based on a program previously stored on a second storage device 45 in collaboration with each element of the information processing apparatus 40.

In step S101, an image input device 31 of the image reading apparatus 30 generates a read image where an imaging subject is imaged and stores the image on a first image memory 32. Since document cutting processing is executed in the image reading apparatus 30, the transmission/reception processing of the read image in step S102 and S201 is omitted.

The processing of step S202 to S204 is executed by an image processing circuit 36 of the image reading apparatus 30. These processing operations are the same as in the case of the execution by the image processing circuit 27 of the information processing apparatus 20 having been described with respect to the image processing system 1. The image processing circuit 36 of the image reading apparatus 30 transmits a cut region to the information processing apparatus 40 via a first interface device 33. On the other hand, in step S205, the second CPU 46 of the information processing apparatus 40 displays a received region on a display device 43.

In this manner, the case where the image reading apparatus 30 includes the image processing circuit 36 to execute document cutting processing also makes it possible to produce the same effect as in the case where an information processing apparatus includes an image processing circuit to execute document cutting processing.

The preferred embodiments of the present invention have been described above but the present invention is not limited to these embodiments. For example, the assignment of functions to the image reading apparatus and the information processing apparatus is not limited to the examples of the image processing system illustrated in FIG. 1 and FIG. 18, and it is possible to appropriately change an arrangement manner of each part of the image reading apparatus and the information processing apparatus, including each unit in the image processing circuit, in either of the image reading apparatus and the information processing apparatus. Alternatively, it is also possible to configure the image reading apparatus and the information processing apparatus as a single device.

In addition, in the image processing system 1 illustrated in FIG. 1, it is possible that instead of a direct connection of the first interface device 13 of the image reading apparatus 10 and the second interface device 21 of the information processing apparatus 20, a connection thereof is established via a network such as the Internet, a telephone network (including a mobile phone network and a general telephone line network), an intranet, and the like. In this case, the first interface device 13 and the second interface device 21 each include a communication interface circuit for a connected network. Further, in this case, it is possible to distribute and arrange a plurality of information processing apparatus s 20 on the network and to share straight line detection processing, rectangle region detection processing, and the like in collaboration of the respective information processing apparatus s 20 so as to provide image processing services by a cloud computing configuration. Thereby, the image processing system 1 is able to efficiently execute document cutting processing with respect to read images read by a plurality of image reading apparatus s 10.

In the same manner, also in the image processing system 2 illustrated in FIG. 18, it is possible to connect the first interface device 33 of the image reading apparatus 30 and the second interface device 41 of the information processing apparatus 40 via a network.

According to the image processing apparatus and image processing method, and the computer-readable, non-transitory medium, it is possible to appropriately determine a cutting off region from a read image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
    an edge pixel extraction circuit for extracting edge pixels from an input image;
    a region detection circuit for detecting a subject region surrounded by connected edge pixels among the edge pixels;
    a straight line detection circuit for detecting a plurality of straight lines within the subject region;
    a rectangle region detection circuit for detecting a rectangle region formed of four straight lines in which two sets of two straight lines are substantially at right angles to each other among the plurality of straight lines; and
    a region determination circuit for determining whether the rectangle region and the subject region are substantially the same based on sizes or shapes of the rectangle region and the subject region, and determining the rectangle region as a cutting off region from the input image when the rectangle region and the subject region are substantially the same.

2. The image processing apparatus according to claim 1, wherein the region determination circuit determines a region including at least the subject region as the cutting off region from the input image, unless any one of rectangle regions detected by the rectangle region detection circuit and the subject region are substantially the same.

3. The image processing apparatus according to claim 1, wherein when an edge of the subject region is close to an edge of the input image, the straight line detection circuit detects the edge of the input image as one of the plurality of straight lines.

4. The image processing apparatus according to claim 3, wherein the region determination circuit determines whether the rectangle region and the subject region are substantially the same based on edge pixels distributing along a side of the rectangle region in a neighboring region of a corner of the rectangle region meeting the edge of the input image, when the rectangle region includes the edge of the input image, the neighboring region being along the side of the rectangle region substantially at right angles to the edge of the input image.

5. The image processing apparatus according to claim 4, wherein the region determination circuit determines whether the rectangle region and the subject region are substantially the same based on a ratio of the number of pixels where edge pixels are present in a direction at right angles to the side of the rectangle region among the pixels constituting the side, to the number of the pixels constituting the side in the neighboring region, when the rectangle region includes the edge of the input image.

6. The image processing apparatus according to claim 1, wherein the region determination circuit determines the rectangle region as the cutting off region from the input image in spite of the rectangle region and the subject region not being substantially the same, when the edge of the subject region is close to the edge of the input image.

7. A method for determining a region comprising:
extracting edge pixels from an input image;
detecting a subject region surrounded by connected edge pixels among the edge pixels;
detecting a plurality of straight lines within the subject region;
detecting a rectangle region formed from four straight lines in which two sets of two straight lines are substantially at right angles to each other among the plurality of straight lines;
determining, using a computer, whether the rectangle region and the subject region are substantially the same based on sizes or shapes of the rectangle region and the subject region; and
determining, using the computer, the rectangle region as a cutting off region from the input image when the rectangle region and the subject region are substantially the same.

8. A non-transitory computer-readable medium storing a computer program, wherein the computer program causes a computer to execute a process, the process comprising:
extracting edge pixels from an input image;
detecting a subject region surrounded by connected edge pixels among the edge pixels;
detecting a plurality of straight lines within the subject region;
detecting a rectangle region formed from four straight lines in which two sets of two straight lines are substantially at right angles to each other among the plurality of straight lines;
determining whether the rectangle region and the subject region are substantially the same based on sizes or shapes of the rectangle region and the subject region; and
determining the rectangle region as a cutting off region from the input image when the rectangle region and the subject region are substantially the same.

* * * * *